Sept. 5, 1933.  W. J. BESLER  1,925,745
BRAKE MECHANISM FOR MOTOR VEHICLES
Filed June 24, 1927  2 Sheets-Sheet 2
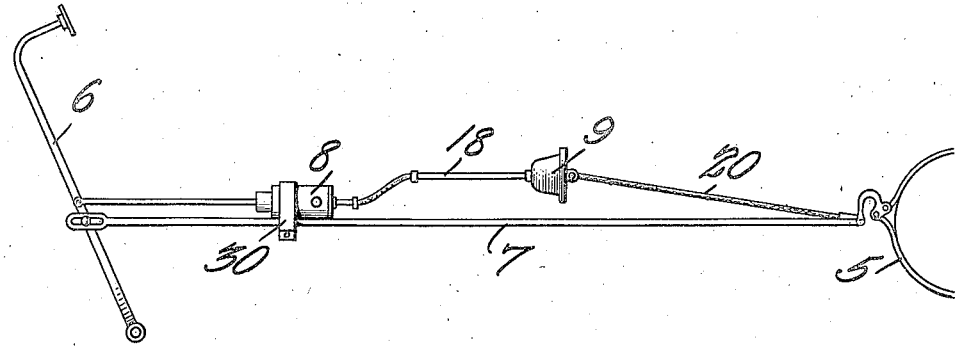
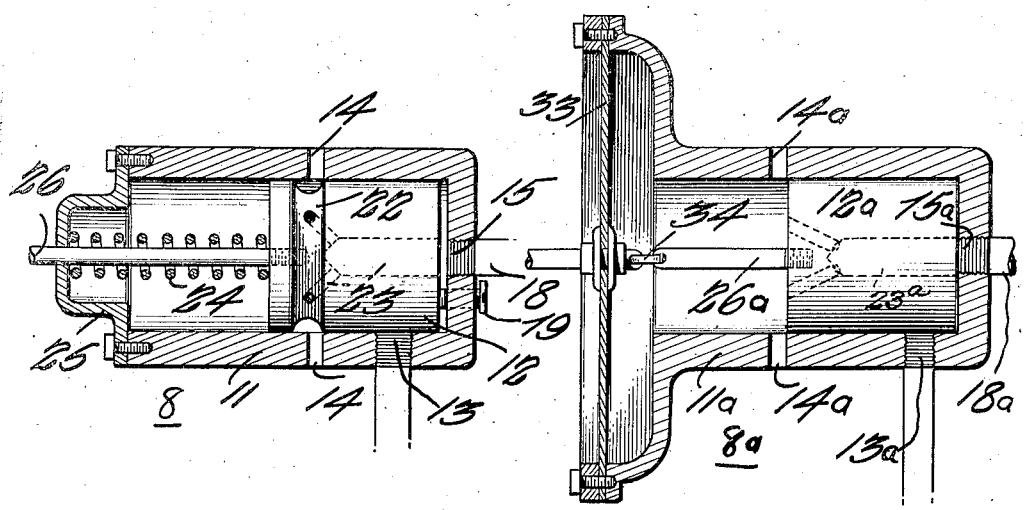
INVENTOR.
ATTORNEY.

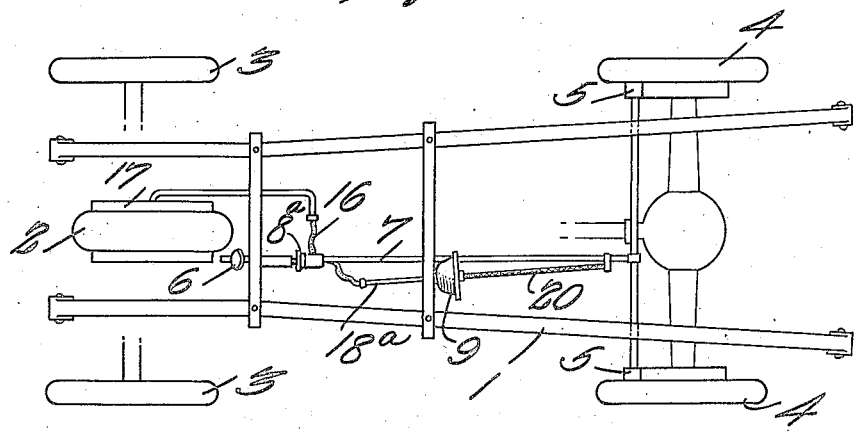
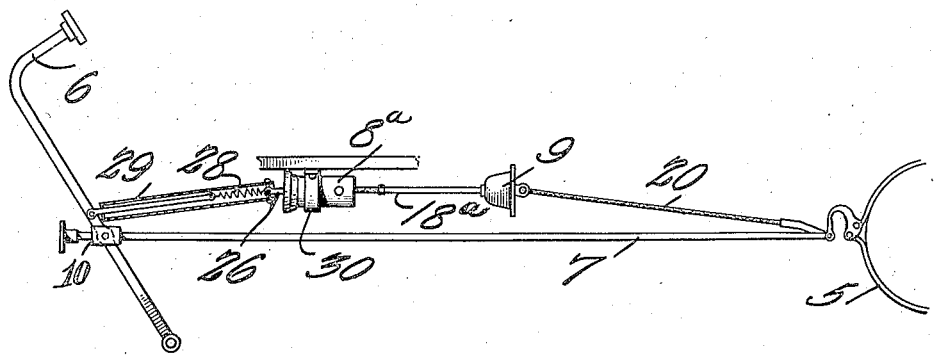

Patented Sept. 5, 1933

1,925,745

UNITED STATES PATENT OFFICE 1,925,745

BRAKE MECHANISM FOR MOTOR VEHICLES

William J. Besler, Plainfield, N. J.

Application June 24, 1927. Serial No. 201,263

3 Claims. (Cl. 303—54)

My invention relates to brake mechanism for motor vehicles and particularly to brake mechanism of the fluid-pressure operated or servomotor type.

An object of my invention, in general terms, is to improve and simplify the construction of brake mechanism of this character.

A further object of my invention is to provide a control valve, adapted to be operated by a control lever or foot pedal, which is simple and rugged in construction so that, although inexpensive to manufacture, it will require practically no attention or adjustment after being installed and will outlast the ordinary motor vehicle with which it is intended to be used.

Other objects and advantages of my invention will appear from the following description of the several modifications thereof shown on the accompanying drawings.

Referring to the drawings, Fig. 1 is a plan view of a conventional vehicle chassis with the improved brake mechanism applied thereto;

Fig. 2 is a side view, to an enlarged scale, of the brake mechanism shown in Fig. 1;

Fig. 3 is a similar view of a modified form of the invention;

Fig. 4 is a detail view of a modified form of the control valve; and

Fig. 5 is a similar view of the control valve shown in Figs. 1 and 2.

Referring to Fig. 1, the general arrangement of apparatus embodying my invention is illustrated as applied to a conventional automobile chassis including a frame 1, an internal-combustion engine 2 at the forward end of the frame 1 and front and rear wheels 3 and 4, respectively, the latter being provided with brakes 5. The chassis and brakes may be of any suitable construction, the present invention being concerned primarily with improved means for controlling and actuating the brakes. I have shown the brake mechanism in connection with a motor vehicle because it is particularly adapted for such use, but the arrangement and application of the brake mechanism may be variously modified.

The brake mechanism comprises a control lever or pedal 6 adapted to operate the brakes 5 through a brake rod 7, and a control valve 8a, the detailed construction of which is shown in Fig. 5, also connected to the pedal 6 and adapted to operate the brakes 5 through the instrumentality of a fluid-pressure device or servo-motor 9. A lost-motion connection 10 is provided, so that in normal operation, there is sufficient lost motion between the brake pedal 6 and the brake rod 7 so that the braking effort will be applied by the servo-motor 9, the brake pedal merely controlling the valve 8a and being inoperative to apply the brakes directly except in case the servo-braking mechanism fails or is insufficient.

As shown in Fig. 5, the control valve 8a comprises a casing 11a having a reciprocable plunger or valve member 12a cooperating with ports 13a and 14a in the peripheral wall of the casing. A port or opening 15a is also provided in one end of the casing 11a, the opposite end of the casing being preferably enlarged and closed by a flexible diaphragm 33 of metal or other resilient material. The valve member 12a is provided with a projecting stem 26a which is connected to the diaphragm 33 by a flexible link 34 to prevent the valve member 12a from binding in the casing. The portion of the valve casing to the left of the valve member 12a and ports 14a is preferably substantially sealed in order to exclude dirt and dust. The valve member 12a is provided with a longitudinal passage or channel 23a whereby the port 15a connected to the motor 9 is placed in communication with either the exhaust port 13a or, through the channel 23a, with the atmospheric ports 14a depending upon the position of the valve member in the casing. As shown in Fig. 1, the port 13a is connected through a flexible pipe connection 16 with the intake manifold 17 of the engine 2 so that when the ports 13a and 15a are placed in communication by depression of the brake pedal 6, the reduced pressure in said manifold energizes the servo-motor 9 to operate the brakes.

The modified form of control valve 8, as shown in Fig. 4, comprises a shell or casing 11 having an internal reciprocable plunger or valve member 12. The casing 11 is provided with ports 13 and 14 cooperating with and exposed or sealed by the edge of the plunger 12 and a third port or opening 15 in the end thereof. As shown in Fig. 1, the port 13 is connected through a flexible pipe connection 16 with the intake manifold 17 of the engine 2, the reduced pressure in said manifold being utilized to operate the brakes when the said intake manifold is connected with the servo-motor 9 by the control valve 8.

The port or ports 14 or 14a are open to the atmosphere and the opening 15 or 15a is connected through the pipe connection 18 or 18a with the vacuum chamber of the servo-motor 9. The servo-motor 9 is preferably of the flexible diaphragm type, its diaphragm being so connected through a flexible cable 20 with the brakes 5 that the brakes will be applied when the air in the vacuum chamber is partially exhausted by reason of its connection to the intake manifold 17 of the engine.

As shown in Fig. 4, the plunger 12 of the valve is provided with a peripheral groove 22 and with longitudinal openings or channels 23 from said groove to the inner end of the plunger. The groove 22 in the valve plunger is so related to the position of the ports 14 that the opening 15 is in communication with the atmosphere when the plunger rests against the stop 19 provided in the inner end of the valve casing. In either form of valve the plunger 12 or 12a is normally held in the position shown by the compression spring 24 or by the diaphragm 33 and by a tube 29 which surrounds the controlling spring 28 and which is pinned to the plunger rod, thus providing a positive release when the pedal is in release position even if friction or the presence of foreign matter in the valve tends to prevent such restoration. The spring 24 is disposed between the plunger 12 and an end cap 25 on the casing, and surrounds a plunger rod 26 fixed to the plunger 12 and extending through the end cap 25 so that it may be connected to the control lever or pedal 6.

In the arrangement shown in Fig. 2, a tension spring 28 is interposed between the rod 26 and the pedal 6, the tension of said spring and the consequent force upon the valve member 12 or 12a depending upon the extent of depression of the pedal. In this modification, the valve 8a is secured directly to the frame of the vehicle in any suitable manner, as by a strap member or clamp 30.

In the modification shown in Fig. 3, the spring 28 and tube 29 are dispensed with and the valve 8 is clamped to the brake rod 7. In both of the constructions just described, the connecting element between the valve and the brake pedal may include a wire or flexible cable which is readily attached to the pedal or may comprise a stiff strong strip of metal or the like.

In operation, the brakes are applied by depression of the brake pedal 6 in the usual manner. Other forms of levers or controlling devices may, of course, be substituted for the specific form illustrated. In the modification shown in Fig. 2, depression of the brake pedal increases the tension in the spring 28 and draws the valve member 12a forwardly, thereby sealing the ports 14a and placing the ports 13a and 15a in communication with each other.

The chamber of the servo-motor 9 is now connected to the intake manifold of the engine, whereupon the slack or play in the braking system is taken up immediately. If the brake pedal has only been depressed slightly, while all of the slack in the braking system is taken up, the tension in the spring 28 is relatively small, and as soon as a slight reduction in pressure in the fluid-pressure circuit has been effected, the suction on the valve member 12 of diaphragm 33, aided by the compression spring 24 or the resiliency of the diaphragm, partially restores the valve member, and seals the exhaust port 13 or 13a. If the brake pedal is now further depressed, or had been further depressed initially, a stronger application of the brakes is effected before a balance obtains between the spring forces and the forces of the fluid-pressures acting on the valve member 12 or 12a. It should be particularly noted that this balanced relation exists over a considerable range of movement of the brake pedal, and permits a gradual and easily manipulated application of the brakes. Release of the brakes is effected by releasing the pedal 6, thereby permitting the valve member 12 or 12a to return to its initial position and connect the port 15 or 15a leading to the servo-motor 9 to the port 14 or 14a which admits air to the servo-motor chamber until a balance again obtains which will seal the ports 14 or 14a. Additional release of the brake pedal will again work similarly until with complete release of the pedal the servo-motor will be held positively connected with the atmosphere by the engagement of the tube 29 with the movable valve member, as an additional precaution to assure positive release.

It will be apparent that over the entire range of application and release of the brakes, the operation of the controlling valve 8 or 8a, and therefore the extent of application of the brakes, is entirely dependent upon a balance between the operating force of the spring 28 and the opposing forces of the spring 24 or diaphragm 33 and the fluid pressures on the movable valve member 12 or 12a. The brakes may be applied or as released either suddenly or gradually and, since a considerable movement of the brake pedal is necessary to apply the brakes fully, it is not difficult to manipulate the pedal to obtain partial brake application when desired. This feature is designed to make the application smooth and gradual as all the lost motion in the braking system will be taken up with the first small movement of the controlling lever.

In the modification shown in Fig. 3, in which the controlling valve 8 is mounted upon the brake rod, the desired operating characteristics are obtained by utilizing the "follow-up" movement of the brake rod, and the spring 28 is unnecessary. As in the first modification, depression of the brake pedal 6 moves the valve member 12 to seal the port 14 and connect the servo-motor 9 to the intake manifold of the engine through the port 13. The resulting application of the brakes moves the brake rod 7 forward, causing the valve casing 11 to follow-up the valve member 12 and seal the port 13 at a point depending upon the extent of movement of the brake pedal. It is therefore possible to obtain partial application and release of the brakes with this construction also.

It will be noted that both forms of valves are simple in construction and inexpensive to manufacture. The valve casing may be made by drilling a hole about one inch in diameter in a block of metal, reaming out this hole to provide a smooth, round internal surface, and then drilling the port openings. Metal tubes or pipes of copper or the like are then brazed or threaded in the openings 13 and 15. The valve member 12 is turned to size from a block of metal and the axial and lateral passages 23 are then drilled therein. The shape of the piston and valve casing may be altered without altering the desired result, although a cylindrical piston is preferred.

It will be apparent that the braking mechanism described herein is simple and rugged in construction, cheap to manufacture, easy to apply to different types of vehicles and adapted to render satisfactory service for indefinite periods without attention or adjustment. Various modifications of the mechanism will occur to those skilled in the art, and therefore I do not wish my invention to be limited in scope except as limitations are contained in the appended claims.

I claim:

1. A control valve for braking systems of the class described comprising a hollow casing provided with ports, a reciprocable valve member therein adapted to cooperate with said ports, the latter being spaced apart and adjacent the opposite ends of said valve member when in its intermediate position, means for positioning said member in desired relation to said ports including a flexible diaphragm arranged in the casing coaxially of said reciprocable valve member and connected to said member and means whereby the interior of the casing at opposite ends of said reciprocable member are in communication at all times.

2. A control valve for braking systems of the class described comprising a hollow casing provided with ports, a reciprocable valve member therein adapted to cooperate with said ports, said ports being so positioned that one end of said member uncovers one of said ports when the opposite ends lap another of said ports and vice versa, and said member being provided with a passage between the ends thereof, operating means for the valve and means for positioning said reciprocable member in the casing including a flexible diaphragm positioned intermediate said operating means and said reciprocable member and coaxially with respect to the latter.

3. A control valve for braking systems of the class described comprising a hollow casing provided with ports in its sides and an enlarged open end coaxial with the casing proper, a longitudinally apertured reciprocable valve member in said casing adapted to cooperate with said ports, the latter being spaced apart and adjacent the opposite ends of said member when in its intermediate position, operating means for the valve and means for closing said enlarged open end and positioning said reciprocable member in the casing including a flexible diaphragm positioned intermediate said operating means and said reciprocable valve member and concentric to said open end.

WILLIAM J. BESLER.